(12) United States Patent
Etherton

(10) Patent No.: US 6,838,520 B2
(45) Date of Patent: Jan. 4, 2005

(54) ADHESIVES FOR FLUOROPOLYMER FILMS AND STRUCTURES CONTAINING SAME

(75) Inventor: Bradley P. Etherton, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 68 days.

(21) Appl. No.: 10/447,394

(22) Filed: May 29, 2003

(65) Prior Publication Data

US 2004/0242778 A1 Dec. 2, 2004

(51) Int. Cl.⁷ .............................. B32B 27/08; C08F 8/00; C08L 23/00; C08L 23/04
(52) U.S. Cl. ...................... 525/191; 525/193; 525/194; 525/240; 524/500; 524/515; 428/515
(58) Field of Search ................................. 525/191, 193, 525/194, 240; 524/500, 515; 428/515

(56) References Cited

U.S. PATENT DOCUMENTS

| | | |
|---|---|---|
| 3,524,795 A | 8/1970 | Perterson |
| 4,659,625 A | 4/1987 | Decroly et al. |
| 4,677,017 A | 6/1987 | DeAntonis et al. |
| 4,810,540 A | 3/1989 | Ellison et al. |
| 4,943,680 A | 7/1990 | Ellison et al. |
| 4,959,269 A | 9/1990 | Dehennau |
| 5,017,714 A | 5/1991 | Welborn, Jr. |
| 5,139,878 A | 8/1992 | Kim et al. |
| 5,304,413 A | 4/1994 | Bloom et al. |
| 5,324,820 A | 6/1994 | Baxter |
| 5,643,999 A * | 7/1997 | Lee et al. .................... 525/193 |
| 6,171,993 B1 | 1/2001 | Mavridis et al. |
| 6,184,298 B1 * | 2/2001 | Lee ............................. 525/240 |
| 6,207,754 B1 | 3/2001 | Yu |
| 6,251,506 B1 | 6/2001 | Davis et al. |
| 6,528,587 B2 * | 3/2003 | Robert et al. ................ 525/191 |
| 6,545,091 B1 * | 4/2003 | Lee et al. ...................... 525/78 |

FOREIGN PATENT DOCUMENTS

| | | |
|---|---|---|
| FR | A-1484153 | 6/1996 |
| WO | WO 94/03337 | 2/1994 |

\* cited by examiner

*Primary Examiner*—Nathan M. Nutter
(74) *Attorney, Agent, or Firm*—Gerald A. Baracka; William A. Heidrich

(57) ABSTRACT

Adhesives useful for adhering fluoropolymers are provided. The adhesives are a blend of linear low density polyethylene, ethylene polymer plastomer, polyolefin elastomer and modified polyolefin having acid or acid derivative functionality. Composite fluoropolymer/adhesive structures are also provided.

21 Claims, No Drawings

ADHESIVES FOR FLUOROPOLYMER FILMS AND STRUCTURES CONTAINING SAME

BACKGROUND OF THE INVENTION

1. Field of the Invention

The invention relates to polyolefin-based adhesive blends suitable for adhering fluoropolymers. More specifically, the adhesive compositions are useful for adhering fluoropolymers to propylene polymers and are blends of linear low density polyethylene, plastomer, elastomeric material and modified polyolefin. The invention also provides composite structures comprising a propylene polymer layer, a poly(vinylidene difluoride) layer and an intervening layer of the adhesive composition.

2. Description of the Prior Art

Poly propylene (PP) resins are widely used by the automotive industry for producing larger parts such as bumpers, body side moldings and the like. While advances have been made in optimizing the physical characteristics of these products, paint adhesion continues to be a problem. Even when suitable finishes are developed for spray application, the process is labor intensive, requiring preparation of the surface of the formed part by priming or the like and the application of one or more coats of the paint finish.

Pigmented thin films cast from poly(vinylidene difluoride) (PVDF) dispersions are increasingly being used by the auto industry for the manufacture of colored trim parts. This process involves thermally laminating a PVDF-based paint film onto a polyolefin sheet, generally a polypropylene-based thermoplastic polyolefin (TPO). The multi-layer sheet is then thermoformed to the desired shape. There is, however, still a problem with this method since PVDF films, like the spray paints they replace, have poor adhesion to propylene polymers. An adhesive or tie layer between the propylene polymer and PVDF layer is necessary to bond the materials.

Chlorinated polyolefins, such as chlorinated polyethylene, have been used to bond PVDF and PP but their use is limited to thermal lamination processes since chlorinated polyethylenes do not flow well at the low shear rates used for coextrusion processes and they are unstable at the high temperatures required for processing PP. In this process a sheet or film of chlorinated polyethylene is separately formed and subsequently sandwiched between layers of PVDF and PP sheet or film and the multi-layer construction thermally laminated to bond the layers together. The resulting multi-layer composite is then thermoformed to obtain the finished part. This procedure is not totally satisfactory since chlorinated polyethylene can evolve hydrogen chloride (HCl) during one or both of the fabrication operations, depending on the temperatures being used.

Polyurethanes and polyacrylics, such as poly(methylmethacrylate), are known adhesives for PVDF. Polyolefins, particularly ethylene-vinyl acetate (EVA) copolymers, are also known. The vinyl acetate (VA) content of useful EVAs tends to be high which substantially limits their utility with PP because they tend to degrade at the high temperatures, typically greater than 450° F., used to process PP. This results in the undesirable liberation of acetic acid and water and the presence of black specks (decomposed polymer).

Dehennau (U.S. Pat. No. 4,959,269) teaches that EVA copolymers (>36% VA) adhere to PVDF but do not adhere as well as the urethanes and acrylates. FR-A-1,484,153 describes the use of EVAs containing 13 to 35% VA for bonding polyolefins to a fluorinated hydrocarbon polymer, including PVDF. Decroly (U.S. Pat. No. 4,659,625) teaches that EVAs containing at least 50% VA bond to PVDF as well as to polar polymers such as polyesters, acrylics, nylons, etc. Kim (U.S. Pat. No. 5,139,878) describes the use of a blend of an anhydride-modified polyolefin and an ethylene-alkyl ester copolymer, such as ethylene-methyl acrylate (EMA), as an adhesive for PVDF. DeAntonis (U.S. Pat. No. 4,677,017) teaches that PVDF can be bonded to polyolefins by using an adhesive polymer blend consisting of a modified EVA (modified with carboxylic acid anhydrides, for example) and an EVA copolymer. Other references which relate to the application of fluoropolymer paint and decorative films on substrates include U.S. Pat. Nos. 4,810,540, 4,943,680 and 6,251,506 and PCT published application (WO 94/0337).

There is a continuing need for adhesives for bonding fluoropolymers. It would be even more advantageous if inexpensive polyolefin adhesive blends which could be coated directly onto PP or coextruded with the PP and used to bond with PVDF films were available.

SUMMARY OF THE INVENTION

These and other objectives are obtained with the adhesive compositions of the present invention which are blends comprised of (a) 20 to 40 weight percent (wt. %), based on the total composition, linear low density polyethylene; (b) 10 to 35 wt. %, based on the total composition, ethylene-α-olefin plastomer; (c) 15 to 40 wt. %, based on the total composition, elastomeric polymer; and (d) 5 to 35 wt. %, based on the total composition, modified polyolefin having 0.3 to 4 wt. % unsaturated acid or acid derivative grafted thereto.

In a preferred embodiment (a) is an ethylene-$C_{4-8}$ α-olefin copolymer having a density from 0.915 up to about 0.925 g/cm$^3$, (b) has a density from 0.86 up to about 0.90 g/cm$^3$, (c) is an ethylene copolymer, such as EPR or EPDM, where ethylene is the predominant monomer and (d) is an ethylene homopolymer or copolymer grafted with maleic anhydride.

Highly useful adhesive blends contain 15 to 35 wt. % (a), 15 to 25 wt. % (b), 20 to 35, wt. % (c) and 10 to 25 wt. % (d). It is particularly advantageous when (d) is a HDPE or LLDPE grafted with from 0.5 to 3.5 wt. % maleic anhydride.

Composite structures comprising a fluoropolymer substrate with the adhesive blends and fluoropolymer/propylene polymer structures having an intervening layer of the adhesive blend are also provided. These structures may be produced by lamination, extrusion or coextrusion processes.

DETAILED DESCRIPTION

The adhesive blends of the invention contain from 20 to 40 wt. % linear low density polyethylene (LLDPE), 10 to 35 wt. % ethylene-α-olefin plastomer, 15 to 40 wt. % elastomeric (co)polymer and 5 to 35 wt. % modified polyolefin having 0.3 to 4 wt. % unsaturated acid or acid derivative grafted thereto. Optional ingredients such as other resins, stabilizers, antioxidants may also be included but their combined total amount will generally be less than 10 wt. % and, more typically, less than 5 wt. %. Weight percentages expressed herein are based on the total weight of the adhesive composition.

LLDPE resins utilized for the invention are obtained by conventional polymerization of ethylene and $C_{4-8}$ α-olefins.

Copolymers of ethylene with butene-1, hexene-1 and octene-1 are particularly useful. These copolymers have densities from about 0.915 up to about 0.925 g/cm$^3$ and melt indexes (MIs) from about 1 up to about 20 g/10 min. MIs provided herein are determined in accordance with ASTM D 1238-01, condition 190/2.16. The LLDPEs include LLDPEs produced using Ziegler-Natta, metallocene or single site catalysts. Also useful are the LLDPE copolymers having a network structure believed to be formed, at least in part, by association of hard and soft phases present in the resin. Such LLDPE resins having a network structure and the processes by which they are prepared and characterized are described in U.S. Pat. No. 6,171,993 which is incorporated herein by reference. Ethylene-hexene-1 copolymers, including the so-called "super hexene" resins, are particularly useful LLDPEs for the formulation of the adhesive blends. Examples of commercially available ethylene-hexene-1 LLDPEs which can be used are GA 615-050 (density 0.918 g/cm$^3$; 7 MI; Equistar Chemicals L. P.); PE 7235 (density 0.924 g/cm$^3$; 3.5 MI; Chevron Phillips Chemical Co.); and LL 3003 (density 0.918 g/cm$^3$; 3.2 MI; ExxonMobil Chemical Co.). Ethylene-hexene-1 copolymers with densities from about 0.917 to about 0.924 g/cm$^3$ and MIs from about 3 to about 8 g/10 min are preferred.

The plastomer component is an ethylene based copolymer having ethylene as the major constituent and prepared using a metallocene or "single site" catalyst. Metallocene or single site catalysts having at least one cyclopentadienyl or analogous ligand coordinated to a transition metal cation and plastomers produced using such catalyst systems are known. Metallocene catalysts and processes are described in U.S. Pat. Nos. 5,017,714 and 5,324,820 which are incorporated herein by reference.

Useful plastomers for the invention are copolymers of ethylene and α-olefins wherein ethylene comprises from about 87 to about 95 mole % and the α-olefin comonomer comprises from about 5 to about 13 mole %. The α-olefins comonomer is typically butene-1, hexene-1 or octene-1 although other α-olefins may be used. The plastomers will have densities ranging from about 0.86 up to about 0.90 g/cm$^3$. Plastomer copolymers are described in more detail in U.S. Pat. No. 6,207,754 which is incorporated herein by reference. To obtain the useful adhesive blends of the invention, plastomers having MIs from 0.5 to 20 g/10 min and, more preferably, 1 to 10 g/10 min are employed. In one highly useful embodiment of the invention, the plastomer is an ethylene-butene-1 copolymer having a density of 0.878 g/cm$^3$ and MI of 3 g/10 min (Exact 4041; ExxonMobil Chemical Co.). Other commercially available plastomers useful for the invention include Exact 4011 (ethylene-butene-1 copolymer; density 0.888 g/cm$^3$; 2.2 MI; ExxonMobil Chemical Co.); Exact 4150 (ethylene-hexene-1 copolymer; density 0.895 g/cm$^3$; 3.5 MI; ExxonMobil Chemical Co.); and Engage 8585 (ethylene-octene-1 copolymer; density 0.885 g/cm$^3$; 2.5 MI; Dow Chemical Co.).

An elastomeric polymer is included with the LLDPE and plastomer to produce the adhesive blends. Elastomers used for this purpose should be compatible with these resins and the modified polyolefin. Incompatibility will result in poor processability, phase segregation during extrusion and poor adhesion. Elastomeric copolymers of ethylene, particularly copolymers wherein ethylene is the predominant monomer, are especially useful.

Ethylene-propylene rubbers (EPR) and ethylene-propylene-diene rubbers (EPDM) are particularly useful elastomeric components for the adhesive compositions of the invention. These elastomers typically contain from about 50 wt. % up to about 80 wt. % ethylene and, in one highly useful embodiment of the invention, an EPR or EPDM containing 55 to 75 wt. % ethylene is utilized. Products of this type are obtained by conventional polymerization procedures known to the art and include the so-called metallocene rubbers. As used herein, the term "elastomer" or "elastomeric" refers to products having rubber-like properties and little or no crystallinity.

Illustrative elastomers of the above type and which are available from commercial sources include BUNA EP T 2070 (22 Mooney ML(1+4) 125° C., 68% ethylene, 32% propylene), BUNA EP T 2370 (16 Mooney, 3% ethylidene norbornene, 72% ethylene; 25% propylene); BUNA EP T 2460 (21 Mooney, 4% ethylidene norbornene, 62% ethylene, 34% propylene), VISTALON 707 (72% ethylene, 28% propylene; 22.5 Mooney); and VISTALON 828 (60% ethylene, 40% propylene; 51 Mooney). BUNA EP T 2070 is particularly useful in this application.

Other elastomers not derived from ethylene may also be included in the adhesive blends. Examples of such elastomers include poly(isobutylene), copolymers of isobutylene and isoprene, chlorinated copolymers of isobutylene and isoprene, copolymers of butadiene and styrene, copolymers of isoprene and styrene, block copolymers of butadiene and styrene, block copolymers of isoprene and styrene, block copolymers of isoprene and vinyl toluene, hydrogenated copolymers of butadiene and styrene, hydrogenated block copolymers of isoprene and styrene, copolymers of acrylonitrile and butadiene, copolymers of methacrylonitrile and butadiene, copolymers of acrylonitrile and isoprene, copolymers of methacrylonitrile and isoprene, and the like.

The adhesive blends also contain a modified polyolefin containing acid or acid derivative functionality. Modified polyolefins of this type are known and, most commonly, are grafted polyethylenes obtained by reacting unsaturated carboxylic acids and carboxylic acid anhydrides, or derivatives thereof, with polyethylene under grafting conditions. The grafting monomers, i.e., acid, acid anhydride or derivative, are incorporated along the polyethylene backbone.

The term polyethylene as used herein includes ethylene homopolymer resins and copolymer resins of ethylene with propylene, butene-1, hexene-1 and octene-1. These homopolymer and copolymer resins are obtained utilizing known polymerization technologies including metallocene and single-site polymerization processes. It also encompasses mixtures of two or more homopolymers or copolymers of the above types. In a particularly useful embodiment of the invention, the grafted polyolefin is a high density polyethylene (HDPE) or LLDPE. Useful HDPEs have densities of 0.94 g/cm$^3$ and above and LLDPEs have densities up to 0.939 g/cc.

Carboxylic acids or anhydrides useful as grafting monomers include compounds such as acrylic acid, maleic acid, fumaric acid, citraconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride, bicyclo(2.2.1)hept-5-ene-2,3-dicarboxylic acid or anhydride, tetrahydrophthalic acid or anhydride, methylbicyclo(2.2.1) hept-5-ene-2,3-dicarboxylic acid or anhydride, nadic anhydride, methyl nadic anhydride, himic anhydride, and methyl himic anhydride. Acid anhydride derivatives which can be used to graft the polyethylene include dialkyl maleates, dialkyl fumarates, dialkyl itaconates, dialkyl mesaconates, dialkyl citraconates and alkyl crotonates. It may be desirable to use more than one grafting monomer in order to control the physical properties of the modified polyolefin product. Maleic anhydride is a particularly useful grafting monomer.

Grafting is accomplished in accordance with known procedures, generally by heating a mixture of the polyolefin and graft monomer(s) with or without a solvent. Most typically, the grafted products are prepared by melt blending the polyethylene in the substantial absence of a solvent with the grafting monomer in a shear-imparting extruder/reactor. Twin screw extruders such as those marketed by Coperion (formerly Werner-Pfleiderer) under the designations ZSK-53 and ZSK-83 are especially useful for carrying out the grafting operation. A free radical generating catalyst, such as an organic peroxide, can be employed but is not necessary.

The amount of acid or acid derivative comonomer(s) grafted onto the polyolefin can range from about 0.3 to about 4 wt. %. In a preferred embodiment of the invention when maleic anhydride is grafted onto HDPE or LLDPE, the grafted maleic anhydride concentration is preferably 0.5 to 3.5 wt. %. The MI of the modified polyolefin is most generally in the range from about 0.5 to about 20 g/10 min.

The adhesive compositions are prepared by melt mixing the LLDPE, plastomer, elastomer and modified polyolefin by any conventional means. Mixing in a Banbury mixer or extruder is especially convenient. The individual components may be dry blended prior to melt mixing or added separately to the melt mixing operation. For most applications the adhesive blends will also contain one or more stabilizing agents, such as antioxidants, thermal stabilizers, UV inhibitors and the like. The type and amount of these stabilizing agents will depend on the end use application. Additional ingredients may be added to the mixture of all of the components as they are being melt blended or pre-incorporated with one or more of the components before the final melt blending operation. This latter procedure, referred to as masterbatching, is advantageously used to incorporate additives employed at low levels. Typically, the melt blended compositions are pelletized for subsequent storage and use, however, they can be used directly as obtained from the melt blending operation.

In a preferred embodiment of the invention, highly useful adhesive blends for bonding fluoropolymers and propylene polymers are comprised of 15 to 35 wt. % LLDPE, 15 to 25 wt. % plastomer, 20 to 35 wt. % elastomer and 10 to 25 wt. % modified polyolefin. It is even more advantageous when the LLDPE is an ethylene-hexene-1 copolymer, most preferably, having a network structure, the plastomer is an ethylene-hexene-1 plastomer, and the elastomer is EPR It is even more preferred when the modified polyolefin is HDPE grafted with 0.5 to 3.5 wt. % maleic anhydride.

The above-described adhesive blends may be used to bond a variety of substrates. For example, they can be used to bond plastic, wood, glass, paper, composite materials, metal and the like to similar or dissimilar substrates. They are, however, most advantageous to bond fluoropolymers, such as PVDF, and (propylene polymer (PP) substrates. Composite structures comprising a PP layer and PVDF layer bonded through an intervening layer of the adhesive blend of the invention are particularly advantageous. Such constructions are represented as PVDF/tie/PP where "tie" represents the adhesive blend. The PP layer may be propylene homopolymer or a copolymer such as an ethylene-propylene impact copolymer or thermoplastic polyolefin (TPO).

PVDF/tie/PP constructions may be produced by layering preformed films of the individual components and thermally laminating to effect bonding. Alternatively, two-layer films obtained by coextruding the adhesive blend with the PVDF or PP can similarly be formed and heat-laminated. For example, a PVDF/tie film could be adhered to a PP film or PP/tie film adhered to a PVDF film using a thermal lamination process. An advantageous mode of manufacture involves coextruding the PVDF, PP and adhesive blend or coextrusion of two of the components, e.g. the PP and adhesive blend, with a layering of a preformed PVDF film onto the molten extrudate. In general, any assembly technique wherein the PVDF and PP are contacted through a molten layer of the adhesive blend will achieve bonding. Optimal bonding, however, will be accomplished by judicious balancing of the assembly method and compositional makeup of the adhesive blend for the particular combination of PVDF and PP used.

The optimum time and temperature employed for thermal lamination will be determined on a case-by-case basis, as will the thickness of the tie layer. In general, however, temperatures employed for thermal lamination will range between about 125 and 200° C. with lamination times varying from about 1 second up to about 2 minutes. The thickness of the tie layer may vary between about 0.1 mil and 10 mils but, most preferably, is from about 0.3 to 2 mils.

The thickness of the PVDF and PP layers and any optional additional layers, comprising the multi-layer construction, and the total thickness of the structure is not critical and will depend on the end-use application. Multi-layer constructions can range from relatively thin films and sheets to relatively thick manufactured articles, such as automotive trim pieces and bumpers. Obviously, the manufacturing techniques employed for the production of such widely diverse products will differ. Whereas coextrusion techniques can be employed to produce multi-layer films, molding and thermoforming procedures are typically employed to form bumpers and other automotive moldings.

For coextrusion procedures, where a multi-layer film is formed by extruding molten layers of each of the materials comprising the various layers of the film, it is necessary that all of the materials have melt properties which are sufficiently similar to permit extrusion through a common die with minimum production problems.

The following examples illustrate the invention; however, those skilled in the art will recognize numerous variations which are within the spirit of the invention and scope of the claims.

To demonstrate the adhesion of the adhesive blends to fluoropolymers and propylene polymers, 2 mil films of the adhesive blend were prepared and heat sealed to PVDF and TPO substrates. Seal temperatures and seal times were varied. The adhesive blend films were obtained by first dry blending the ingredients and then melt-mixing the mixture in a twin screw extruder at about 425° F. followed by pelletization. The pelletized blend was then extruded into a 6 inch wide 2 mil film on a ¾ inch Brabender single screw extruder with a 24:1 L/D ratio and a 3:1 compression ratio. The extruder melt temperature was about 425° F.

The adhesive blend film was then heat sealed to 1.5 mil TPO film and PVDF film and tested for adhesion. The TPO film was produced from a commercial mineral-filled thermoforming grade resin (EQUISTAR PD951GRY) having a MFR of 1.7 g/10 min (ASTM D1238-01, condition 230/2.16). The PVDF film was a commercial pigmented PVDF paint film previously laminated to a substrate. A Sencorp Model 12 ASL/1 heat sealer was used. The top seal bar was heated to temperatures ranging from 300° F. to 425° F. The bottom seal bar was unheated. For the heat sealing a 2 mil piece of Teflon film was placed between the top seal bar and the adhesive blend film and the bottom seal bar and the TPO or PVDF substrate. The pressure was 40 psig.

The heat-sealed constructions were tested for adhesion by manually pulling to determine whether the films could be peeled apart, i.e., adhesive failure, or whether there was cohesive failure indicating the adhesive bond was greater than the tensile strength of the adhesive film. The peel geometry was varied depending on whether adhesion to TPO or PVDF was being evaluated. For TPO adhesion, a conventional T-peel geometry (ASTMD 1876) was used, i.e., the films were pulled 180° from each other. Since the PVDF was on a stiff backing, the adhesive film was pulled at an angle of 90° away from the PVDF substrate.

The adhesive film was prepared using an adhesive blend containing 31 wt. % LLDPE (ethylene-hexene copolymer; density 0.918 g/cm$^3$; MI 7 g/10 min), 25 wt. % ethylene-butene plastomer; density 0.878 g/cm$^3$; MI 3 g/10 min), 14 wt. % maleic anhydride-grafted HDPE (1.8 wt. % MAH; density 0.946 g/cm$^3$; MI 10 g/10 min), and 30 wt. % ethylene-propylene rubber (68 wt. % ethylene; 32 wt. % propylene; Mooney 0.22 ML(1+4) 125° C.).

Peel strength of the adhesive film with both the TPO and PVDF increased with both increasing seal temperature and increasing seal time. Using a sealing time of 1 second for the PVDF samples, successful bonding was achieved at temperatures greater than 350° F. i.e., cohesive strength was less than adhesive strength. When the seal time was increased to 2 seconds, acceptable adhesion to the PVDF substrate was achieved at temperatures below 350° F. Films sealed at temperatures of approximately 300° F. could not be peeled apart. With the samples prepared using the TPO film and 2 second sealing time, peel strength increased as the temperature was increased to 425° F. At 425° F. the sample failed cohesively and could not be peeled apart. The significance of the above results for adhering PVDF substrates is demonstrated by comparing the peel strengths obtained with the PVDF film using a commercial heat seal adhesive comprised of 68 wt. % ethylene-vinyl acetate copolymer, 5 wt. % ethylene-butene plastomer, 12 wt. % maleic anhydride-grafted HDPE and 15 wt. % ethylene-propylene rubber. Whereas the peel strength increased somewhat with increasing seal time and seal temperature, the films could always be peeled apart, i.e., adhesive failure, even at seal temperatures up to 400° F. and sealing time of 2 seconds.

The above results demonstrate the suitability of the adhesive blends of the invention as an adhesive for PVDF in laminate applications where PVDF is employed as a clear coat or as a binder system to carry the pigments used in color and grain coats. PVDF is employed for such applications due to its resistance to WV light, weatherability and chemical resistance.

I claim:

1. An adhesive blend comprising:
   (a) 20 to 40 wt. %, based on the total composition, linear low density polyethylene;
   (b) 10 to 35 wt. %, based on the total composition, ethylene-α-olefin plastomer;
   (c) 15 to 40 wt. %, based on the total composition, elastomeric polymer; and
   (d) 5 to 35 wt. %, based on the total composition, modified polyolefin having 0.3 to 4 wt. % unsaturated acid or acid derivative grafted thereto.

2. The adhesive blend of claim 1 wherein (a) is an ethylene-$C_{4-8}$ α-olefin copolymer having a density from 0.915 up to about 0.925 g/cm$^3$; (b) has a density from 0.86 up to about 0.90 g/cm$^3$; and (d) is an ethylene homopolymer or copolymer grafted with maleic anhydride.

3. The adhesive blend of claim 1 wherein (a) an ethylene-$C_{4-8}$ α-olefin copolymer having a density of 0.915 up to about 0.925 g/cm$^3$ and melt index from 1 up to about 20 g/10 min.

4. The adhesive blend of claim 3 wherein (a) is a copolymer of ethylene with butene-1, hexene-1 or octene-1.

5. The adhesive blend of claim 4 wherein (a) is a copolymer of ethylene and hexene-1 having a density from 0.917 to 0.924 g/cm$^3$ and melt index from 3 to 8 g/10 min.

6. The adhesive blend of claim 1 wherein (b) is a copolymer comprised of 87 to 95 mole percent ethylene and 5 to 13 mole percent butene-1, hexene-1 or octene-1 having a density from 0.86 up to about 0.90 g/cm$^3$ and melt index from 0.5 to 20 g/10 min.

7. The adhesive blend of claim 6 wherein (b) is a copolymer of ethylene and butene-1 having a melt index from 1 to 10 g/10 min.

8. The adhesive blend of claim 1 wherein (c) is an ethylene copolymer wherein ethylene is the predominant monomer.

9. The adhesive blend of claim 8 wherein (c) is an ethylene-propylene rubber containing 50 to 80 wt. % ethylene.

10. The adhesive blend of claim 8 wherein (c) is an ethylene-propylene diene rubber containing 50 to 80 wt. % ethylene.

11. The adhesive blend of claim 1 wherein (d) is an ethylene homopolymer or copolymer of ethylene with propylene, butene-1, hexene-1 or octene-1 grafted with maleic anhydride.

12. The adhesive blend of claim 11 wherein (d) is a high density polyethylene grafted with 0.5 to 3.5 wt. % maleic anhydride and having a melt index from 0.5 to 20 g/10 min.

13. The adhesive blend of claim 11 wherein (d) is a linear low, density polyethylene grafted with 0.5 to 3.5 wt. % maleic anhydride and having a melt index from 0.5 to 20 g/10 min.

14. The adhesive blend of claim 2 containing 15 to 35 wt. % (a), 15 to 25 wt. % (b), 20 to 35 wt. % (c) and 10 to 25 wt. % (d).

15. A composite structure comprising:
   (i) a fluoropolymer substrate, and adhered thereto;
   (ii) an adhesive blend comprising:
      (a) 20 to 40 wt. %, based on the total weight of the adhesive blend, linear low density polyethylene having a density from 0.915 up to about 0.925 g/cm$^3$;
      (b) 10 to 35 wt. %, based on the total weight of the adhesive blend, ethylene-α-olefin plastomer having a density from 0.86 up to about 0.90 g/cm$^3$;
      (c) 15 to 40 wt. %, based on the total weight of the adhesive blend, elastomeric ethylene copolymer wherein ethylene is the predominant monomer; and
      (d) 5 to 35 wt. %, based on the total weight of the adhesive blend, modified ethylene homopolymer or copolymer grafted with 0.3 to 4 wt. % maleic anhydride.

16. The composite structure of claim 15 produced by lamination, extrusion or coextrusion processes.

17. The composite structure of claim 16 wherein the fluoropolymer substrate is poly(vinylidene difluoride).

18. The composite structure of claim 16 further comprising a propylene polymer substrate and wherein said fluoropolymer and propylene polymer substrates are adhered together by an intervening layer of the adhesive blend.

19. The composite structure of claim 18 wherein the fluoropolymer is poly(vinylidene difluoride) and the propylene polymer is a homopolymer or copolymer of propylene.

20. The composite structure of claim 19 wherein the fluoropolymer is a pigmented poly(vinylidene difluoride) film.

21. The composite structure of claim 19 wherein the propylene polymer is a thermoplastic polyolefin.

* * * * *